United States Patent
Schepmann

(10) Patent No.: US 9,764,658 B1
(45) Date of Patent: Sep. 19, 2017

(54) ELECTRIC MOTOR CONTROL BY TORQUE PERTURBATION

(71) Applicant: Proterra Inc., Greenville, SC (US)

(72) Inventor: Seneca Andrew Schepmann, Greenville, SC (US)

(73) Assignee: Proterra Inc., Greenville, SC (US)

( * ) Notice: Subject to any disclaimer, the term of this patent is extended or adjusted under 35 U.S.C. 154(b) by 0 days.

(21) Appl. No.: 15/188,757

(22) Filed: Jun. 21, 2016

(51) Int. Cl.
*B60L 15/20* (2006.01)
*B60W 10/08* (2006.01)
*B60L 11/18* (2006.01)
*B60W 20/00* (2016.01)
*B60L 9/00* (2006.01)

(52) U.S. Cl.
CPC ....... *B60L 15/2045* (2013.01); *B60L 11/1861* (2013.01); *B60W 10/08* (2013.01); *B60L 9/00* (2013.01); *B60L 2200/18* (2013.01); *B60L 2240/421* (2013.01); *B60L 2240/423* (2013.01); *B60L 2250/26* (2013.01); *B60W 20/00* (2013.01); *B60W 2510/081* (2013.01); *B60W 2540/10* (2013.01)

(58) Field of Classification Search
CPC .............. B60L 15/2045; B60L 11/1861; B60L 2240/421; B60L 2200/18; B60L 2250/26; B60L 9/00; B60L 2240/423; B60W 2050/0026; B60W 20/20; B60W 20/10; B60W 10/08; B60W 2510/081; B60W 2540/10; Y02T 10/7258

See application file for complete search history.

(56) References Cited

U.S. PATENT DOCUMENTS

| | | | |
|---|---|---|---|
| 8,453,773 B2 | 6/2013 | Hill | |
| 2013/0179133 A1* | 7/2013 | Fujinaga | B60L 15/2045 703/2 |
| 2014/0070767 A1 | 3/2014 | Morris | |
| 2015/0203092 A1* | 7/2015 | Johri | B60W 20/10 701/22 |

* cited by examiner

*Primary Examiner* — Dale Moyer
(74) *Attorney, Agent, or Firm* — Bookoff McAndrews, PLLC

(57) ABSTRACT

A control unit of an electric vehicle receives a signal indicative of an operator desired torque and sends a signal to the traction motor to output a value of torque that is the algebraic sum of the operator desired torque and a torque modification factor calculated by the control unit. The control unit calculates the torque modification factor from an efficiency map of the motor which indicates the efficiency of the motor as a function of its output torque and rotational speed.

20 Claims, 4 Drawing Sheets

ELECTRIC MOTOR CONTROL BY TORQUE PERTURBATION

TECHNICAL FIELD

Embodiments of this disclosure relate to methods and systems to control an electric motor.

BACKGROUND

In an electric vehicle, or a hybrid vehicle operating in the electric mode, an electric motor serves as the source of power for the vehicle. In such vehicles, a battery provides power to drive the motor to produce torque. An inverter coupled to the motor directs current to the motor to produce torque in response to a torque request by a driver of the vehicle. The driver controls the position of the accelerator and brake pedals to request different amounts of torque from the motor. When the driver presses down on (or depresses) the accelerator pedal, a powertrain controller detects the position of the pedal and sends a signal to the inverter/motor controller to increase the torque produced by the motor. When the driver releases the accelerator pedal and/or presses down on the brake pedal, the power train controller sends a signal to the motor/inverter controller to decrease the motor torque. Based on the accelerator and brake pedal positions, the powertrain controller generates a torque request signal which is directed to the motor/inverter controller which actuates the motor to produce the requested torque.

For any given motor speed, there exists an optimum value (or region) of output torque that results in maximum motor efficiency. An efficiency graph (or iso-efficiency plots) for a motor, includes curves of the motor efficiency for different rotational speeds and torque values. Since the torque output of an electric vehicle motor at any instant is determined based on the driver's request, the operating condition of the motor at that instant may not be optimal. The current disclosure provides systems and methods of controlling the electric motor of the vehicle that may alleviate the concern discussed above. The scope of the current disclosure, however, is defined by the attached claims, and not by the ability to solve any specific problem.

SUMMARY

Embodiments of the present disclosure relate to, among other things, systems and methods for controlling the motor of an electric vehicle, and electric vehicles that incorporate the control methodology. Each of the embodiments disclosed herein may include one or more of the features described in connection with any of the other disclosed embodiments.

In one embodiment, an electric vehicle comprising an electric motor is disclosed. The electric motor may be configured to provide traction for the vehicle. The electric vehicle may also include a control unit. The control unit may be configured to receive a signal indicative of an operator desired torque and determine a torque modification factor at the desired torque from an efficiency map of the electric motor. The efficiency map may indicate an efficiency of the electric motor as a function of output torque and rotational speed. The control unit may also be configured to calculate a requested torque as the algebraic sum of the received desired torque and the determined torque modification factor. The electric vehicle may further include an inverter operatively coupled to the control unit and the electric motor. The inverter may be configured to receive a signal indicative of the calculated requested torque and control the electric motor to produce the requested torque.

In another embodiment, a method of controlling an electric traction motor of an electric vehicle is disclosed. The method may include receiving, at a control unit, a signal indicative of an operator desired torque. The method may also include determining, using the control unit, a torque modification factor at the desired torque from an efficiency map of the electric motor. The efficiency map may indicate an efficiency of the electric motor as a function of output torque and rotational speed. The method may further include calculating, using the control unit, a requested torque as the algebraic sum of the received desired torque and the determined torque modification factor. The method may additionally include controlling the electric motor to produce the requested torque.

In yet another embodiment, a method of controlling an electric traction motor of an electric vehicle is described. The method may include receiving a signal indicative of an operator desired torque and determining a torque modification factor at the operator desired torque from an efficiency map of the electric vehicle powertrain. The efficiency map may indicate the efficiency of the powertrain as a function of output torque and rotational speed. The method may also include calculating a requested torque as the algebraic sum of the received operator desired torque and the determined torque modification factor, and controlling the electric motor to produce the requested torque.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes systems and methods for controlling the torque output of an electric motor. While principles of the current disclosure are described with reference to the traction motor of an electric bus, it should be understood that the disclosure is not limited thereto. Rather, the systems and methods of the present disclosure may be used to control an electric motor in any vehicle application having an electric or hybrid drive.

Figure 1A:
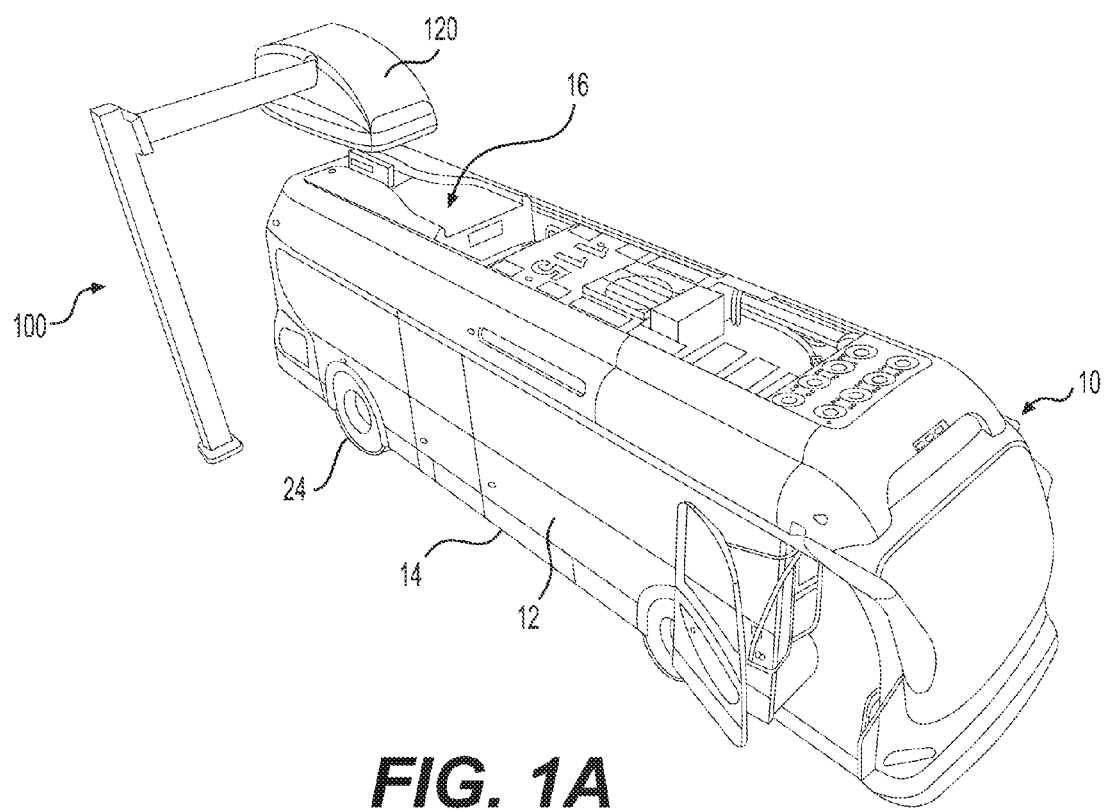
FIGS. 1A and 1B illustrate an exemplary electric bus.
Figure 1B:
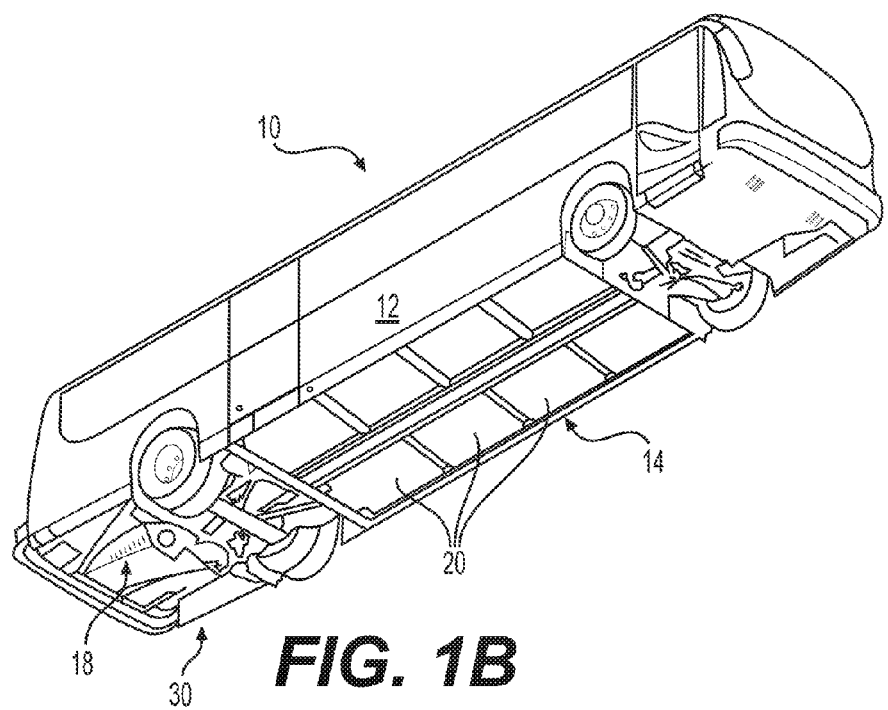

FIGS. 1A and 1B illustrate an electric vehicle in the form of a bus 10. FIG. 1A shows the bus 10 with its roof visible, and FIG. 1B shows the bus 10 with its undercarriage visible. In the discussion below, reference will be made to both FIGS. 1A and 1B. Electric bus 10 may include a body 12 enclosing a space for passengers. In some embodiments, some (or substantially all) parts of body 12 may be fabricated using one or more composite materials to reduce the weight of bus 10. Without limitation, body 12 of bus 10 may have any size, shape, and configuration. In some embodiments, bus 10 may be a low-floor electric bus. As is known in the art, in a low-floor bus, there are no stairs at the front and/or the back doors of the bus. In such a bus, the floor is positioned close to the road surface to ease entry and exit into the bus. In some embodiments, the floor height of the low-floor bus may be about 12-16 inches from the road surface. In this disclosure, the term "about" is used to indicate a possible variation of ±10% in a stated numeric value.

Bus 10 may include a powertrain 30 that propels the bus 10 along a road surface. Powertrain 30 may include an electric motor 32 (FIG. 2) that generates power, and a transmission 34 (FIG. 2) that transmits the power to rotate the wheels 24 of the bus 10. Batteries 14 may store electrical energy to power the electric motor 32. In some embodiments, these batteries 14 may be configured as a plurality of battery packs 20 positioned in cavities (see FIG. 1B) located under the floor of the bus 10. In some embodiments, some or all of the battery packs 20 may be positioned elsewhere (e.g., roof) on the bus 10. The batteries 14 may have any chemistry and construction. The battery chemistry and construction may enable fast charging of the batteries 14. In some embodiments, the batteries 14 may be lithium titanate oxide (LTO) batteries. In some embodiments, the batteries 14 may be nickel metal cobalt oxide (NMC) batteries. It is also contemplated that, in some embodiments, the batteries 14 may include multiple different chemistries. Some of the possible battery chemistries and arrangements in bus 10 are described in commonly assigned U.S. Pat. No. 8,453,773, which is incorporated herein by reference in its entirety.

A charging interface 16 may be provided on the roof of the bus 10 to charge the batteries 14. The charging interface 16 may include components that interface with the charging head 120 of an external charging station 100 to charge the batteries 14. These components may include a charging blade that includes one or more electrodes of the bus 10 and a funnel-shaped alignment scoop including rails positioned on either side of the charging blade. To charge the batteries 14, when the bus 10 is positioned below the charging head 120 of the charging station 100, a portion of the charging head 120 may be activated to descend and land on the roof of the bus 10. With the portion of the charging head 120 resting on the roof, the bus 10 may be moved forward to move the charging blade towards the descended portion of the charging head 120. As the blade approaches the charging head 120, the funnel-shaped alignment scoop of the bus may align, and assist in the engagement of, the charging head 120 with the charging blade 16. Some possible embodiments of charging interfaces 16 that may be used for bus 10 are described in commonly-assigned U.S. Patent Application Publication No. 2014/0070767, which is incorporated by reference in its entirety herein. Although a roof-based charging interface 16 is described above, it is also contemplated that bus 10 may additionally or alternatively include an electric socket at another location (side, rear, etc.) of the bus 10. The charging socket may be configured to receive a charging plug to charge the bus 10 using building (home, shop, etc.) power. In such embodiments, the bus 10 may additionally or alternatively be charged by connecting the plug to the socket.

Figure 2A:
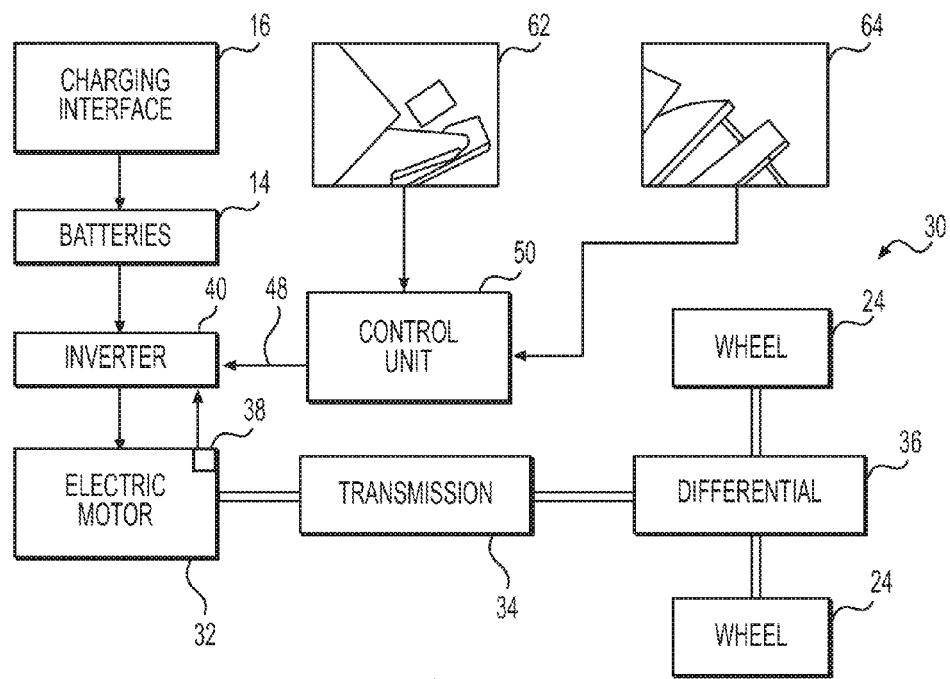
FIG. 2A is a schematic illustration of an exemplary control unit of the bus of FIG. 1A.

FIG. 2A is a schematic illustration of a control system 50 that controls the operation of the powertrain 30 of the bus 10. The powertrain 30 includes the electric motor 32 that is coupled to the wheels 24 of the bus 10 through the transmission 34. Although only one electric motor 32 is illustrated in FIG. 2A, in general, the powertrain 30 may include any number of electric motors 32. For example, in some embodiments, a separate motor 32 may be coupled to each wheel 24 of bus 10. The electric motor 32 may be a permanent magnet synchronous motor (AC motor) that operates using power from the batteries 14. In some embodiments, high voltage DC power from the batteries 14 may be converted into 3-phase AC power using an inverter 40 and directed to the motor 32. The motor 32 rotates an input shaft that connects the motor 32 to the transmission 34. An output shaft from the transmission 34 rotates the wheels 24 through a differential 40. In general, the torque output of the electric motor 32 is proportional to the magnitude of the current directed into the electric motor 32 from the inverter 40. Although the electric motor 32 is described as a single permanent magnet synchronous motor, one or more other types of motors may be used in powertrain 30.

As is known in the art, transmission 34 may include a plurality of gears (not shown) configured to switch between different gear ratios to convert the rotation speed (and torque) of the input shaft to several different speeds (and torques) of the output shaft. While, in general, any type of transmission 34 with any number of gear ratios may be used in bus 10, in some embodiments, transmission 34 may be an automated manual transmission that provides two gear ratios using a set of planetary gears. As is known in the art, the planetary gears may include sun, ring, carrier and planetary gears, and a plurality of clutches adapted to selectively couple several of the gears together to change the gear ratio between the input shaft and the output shaft based on instructions from the control unit 50.

The control unit 50 may be an integrated master control system that controls several operations of the bus 10. In some embodiments, control unit 50 may be a distributed control system as known to people of ordinary skill in the art. That is, the functions of control unit 50 may be divided between several different control systems (e.g., powertrain controller, inverter/battery controller, vehicle controller, etc.) of the bus 10. As is known in the art, control unit 50 may include a collection of several mechanical, electrical, and integrated circuit devices (for example, computational units, A/D converters, memory, switch, valves, actuators, fuses, etc.) that function collectively to control the operation of the bus 10.

Among other functions, the control unit 50 may control the operation of the powertrain 30 based on several inputs from the bus 10. These inputs may include a signal indicative of the position of the accelerator pedal (accelerator 62) and the brake pedal (brake 64) of the bus 10. In use, when the driver of the bus 10 desires more torque (e.g., to climb a hill, accelerate, etc.) from the motor 32, the driver may press down on the accelerator 62. Pressing down the accelerator 62 (i.e., changing the position of the accelerator 62 from a less-depressed state to a more-depressed state) is indicative of a positive torque request from the driver. Similarly, when the driver wishes to reduce the torque output of the motor 32, the driver may release the accelerator 62 (i.e., change the position of the accelerator 62 from a more-depressed state to a less-depressed state) or press down on the brake 64 to produce a negative torque request. Position sensors (not shown), operatively coupled to the accelerator 62 and the brake 64, may convert the position of the accelerator 62 and the brake 64 to voltage signals. As illustrated in FIG. 2A, these voltage signals may be directed to the control unit 50. The signals from the accelerator 62 and/or the brake 64 correspond to the desired torque (which may be a positive or negative) from the driver. Based on the voltage signal from the accelerator 62 and the brake 64 (i.e., driver desired torque), the control unit 50 may send a torque request signal 48 to the inverter 40 to produce torque. The torque request signal 48 may include signals indicative of a particular value of current and/or voltage that, when directed to the motor 32, will produce the desired torque.

Figure 2B:
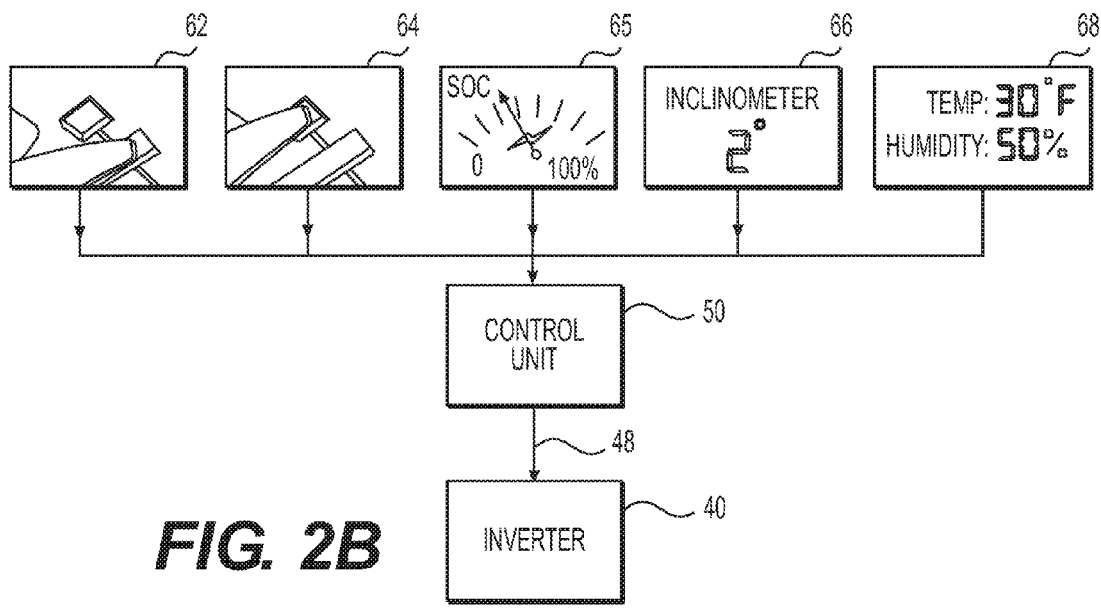
FIG. 2B is a schematic illustration of another exemplary control unit of the bus of FIG. 1A.

In some embodiments, control unit 50 may also receive other inputs indicative of the operating conditions of the bus 10. For example, as illustrated in FIG. 2B, these inputs may include, among others, signals from a fuel gauge 65 that are indicative of state of charge (SOC) of the batteries 14, passenger load, signals from an inclinometer that are indicative of the grade of the road that the bus 10 is traveling on, signals from sensors 68 that indicate the ambient weather conditions (temperature, precipitation, humidity, etc.). The torque request signal 48 to the inverter 40 may be based on these signals and the driver requested torque. For instance, in some embodiments, when the state of charge of the batteries 14 is below a threshold value, the control unit 50 may decrease (or de-rate) the driver requested torque so that the torque output by the motor 32 does not exceed a predetermined value. Similarly, in some embodiments, when the temperature is below a threshold value, and/or when the passenger load is above a threshold value, and/or when the road grade is above or below a threshold value, the control unit 50 may de-rate the requested torque.

Although driver input using accelerator and brake pedals are illustrated in FIGS. 2A and 2B, in general, driver input can be provided to the control unit 50 using any method. For instance, in some embodiments, in addition to or alternative to the pedals, switches, potentiometers, levers, buttons, keypads, etc. may be provided for driver input. In some such embodiments, the driver may set a preferred level of torque using buttons to indicate the driver's preference for the maximum and/or minimum acceleration for the bus, or a preferred HVAC setting for cooling.

As is known in the art, inverter 40 may be an electronic device (or circuitry) adapted to convert direct current (DC) from the battery 14 to alternating current (AC). In response to a torque request signal 48 from the control unit 50, the inverter 40 may activate IGBTs (insulated-gate bipolar transistors) or other switches of the inverter 40 to convert the direct current from the batteries 14 to simulated AC current for the electric motor 32. In some embodiments, the inverter 40 may select the voltage and the frequency of the AC current to produce the desired torque output (positive or negative). Motor 32 may include one or more sensors 38 (speed sensor, torque sensor, etc.) configured to provide a signal indicative of the actual output torque of the motor 32. The inverter 40 may use the output of sensor 38 as feedback to modify (increase, decrease, etc.) the current directed to the motor 32 to produce the desired torque output. Additionally or alternatively, in some embodiments, the inverter 40 may include a sensor (current sensor, etc.) that measures the current directed to the motor 32. Since, the torque produced by the motor 32 is proportional to the current directed to it, the inverter 40 may use the detected current as a feedback signal for the actual torque output. Although FIG. 2A illustrates the sensor 38 as providing input to the inverter 40, in some embodiments, the signals from the sensor 38 may additionally or alternatively be directed to the control unit 50. In such embodiments, the control unit 50 may modify the torque request signal 48 based on feedback from the sensor 38.

Figure 3:
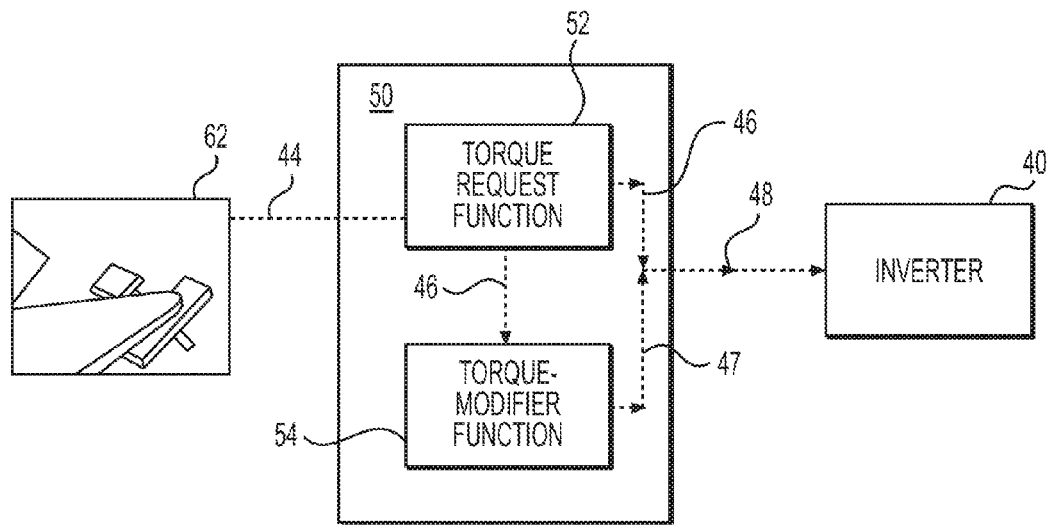
FIG. 3 is a functional illustration of the exemplary control unit of FIG. 2A.

FIG. 3 is a schematic illustration of the interaction between the control unit 50 and the inverter 40. As explained previously, control unit 50 sends the torque request signal 48 to the inverter 40 based on, among other signals, a signal indicative of a driver desired torque (desired torque signal 44) from the accelerator 62. The control unit 50 includes systems and/or algorithms that convert the desired torque signal 44 to the torque request signal 48. These systems and/or algorithms may include, among others, a torque-request function 52 and a torque-request-modifier function (torque-modifier function 54). In some embodiments, the torque-request and torque-modifier functions 52, 54 include hardware modules, and in some embodiments, they may include algorithms or software modules. The torque-request and torque-modifier functions 52, 54 may be configured to produce signals directed to the inverter 40 in response to the desired torque signal 44 from the driver.

In some embodiments, torque-request function 52 may convert the desired torque signal 44 (signal indicative of the position of the accelerator 62 or brake 64) into a torque request 46. As explained previously, in some embodiments, desired torque signal 44 may include a voltage signal output by a position sensor (e.g., an optical encoder) operatively coupled to the accelerator 62 and/or brake 64. The torque-request function 52 may translate this input voltage into a torque request 46. In some embodiments, torque-request function 52 may include a map (table, graph, etc.), an empirical relation, or an equation that converts the input voltage signal to the torque request 46. This torque request 46 may be directed to the inverter 40. In some embodiments (e.g., where torque modifier 47=zero), torque request 46 may be a signal (i.e., any characteristic of a signal e.g., current, voltage, frequency, etc.) that, when applied to motor 32, will produce a torque corresponding to the driver's torque request (desired torque signal 44). That is, when torque modifier 47=zero, torque request 46=torque request signal 48.

In some cases, the torque-modifier function 54 may receive the torque request 46 and output a torque modifier 47. Torque modifier 47 is a signal that modifies (i.e., adds to or subtracts from) the torque request 46. Determination of the torque modifier 47 based on the torque request 46 will be described below with reference to FIG. 4. The torque modifier 47 may be indicative of a value of torque that, when added or subtracted from the driver's torque request, improves the efficiency of the motor 32. The torque-modifier function 54 may determine the torque modifier 47 based on maps, table, equations, etc. that represent an efficiency curve 70 of motor 32. The efficiency curve 70 may be programmed in (or otherwise provided to) the torque-modifier function 54. As known to people of ordinary skill in the art, an efficiency curve 70 is an individual characteristic of every electric motor that defines the operating efficiency of the motor as a function of its rotation speed and torque output. Efficiency curve 70 may be determined by numerical modeling based on the operating conditions of bus 10, or may be provided by the component manufacturer.

Figure 4:
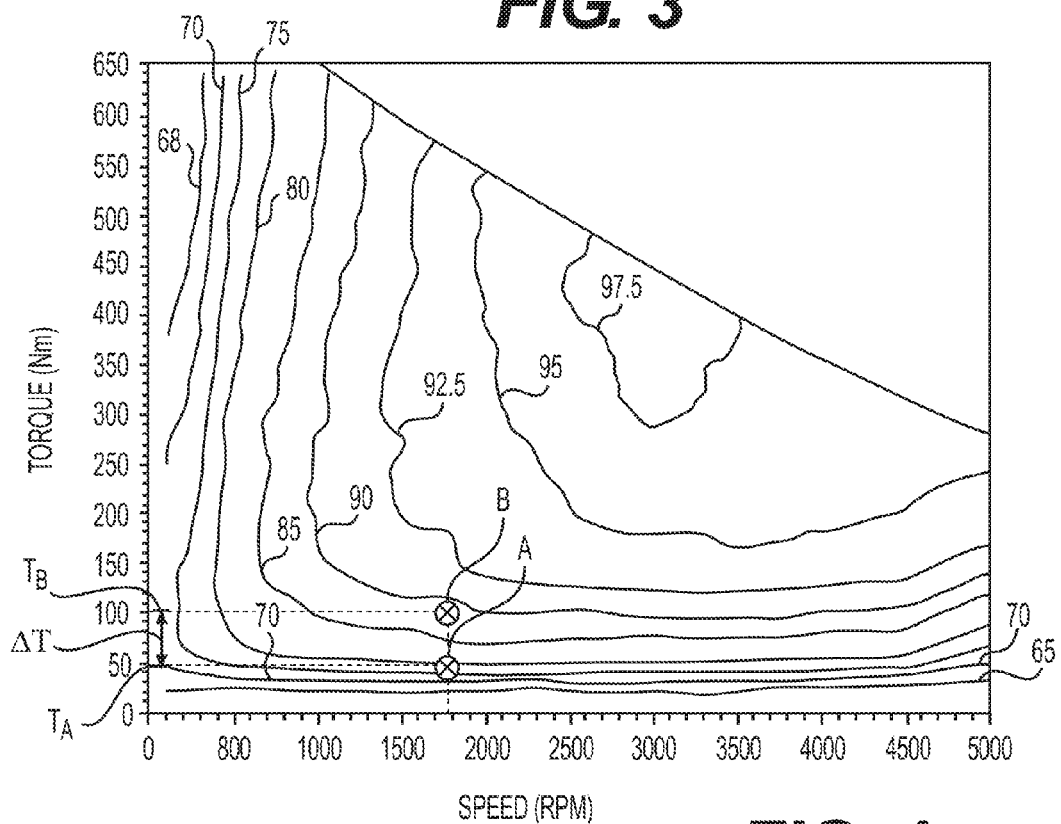
FIG. 4 is an illustration of an exemplary efficiency curve of the electric motor of the bus of FIG. 1A.

FIG. 4 is an illustration of an exemplary efficiency curve 70 of motor 32. In the graph of FIG. 4, the vertical axis (or Y-axis) denotes torque in Nm (Newton-meter), and the horizontal axis (or X-axis) denotes rotating speed in RPM (rotations per minute) of the motor 32. The plurality of curved lines in FIG. 4 represent the iso-efficiency curves for motor 32. Each iso-efficiency curve is a line connecting points (i.e., speed and torque combinations) which have the same power efficiency (e.g., torque×rotating speed/electric power) as each other in the graph of the torque versus rotating speed. The numbers (87.5, 90, etc.) indicated alongside each iso-efficiency curve in FIG. 4 indicates the percentage efficiency associated with the corresponding curve. When the motor 32 is operated at the torque and speed corresponding to the different points of an iso-efficiency curve, the motor 32 will operate at a constant efficiency. As can be seen from FIG. 4, at torque outputs above about 100 Nm, the efficiency of the motor 32 increases as its rotating speed increases. After the speed reaches a threshold value (not shown), efficiency decreases as the speed increases. At a constant speed, the efficiency of the motor 32 increases as its output torque increases. After a threshold value of torque, efficiency decreases with increasing torque. It should be noted that, although controlling the bus based on the efficiency curve of the motor is described, it is also contemplated that the bus may be controlled based on other efficiency metrics. For instance, in some embodiments, a system level efficiency map may be used to control the bus. In some embodiments, the efficiency curve 70 may indicate the efficiency of the powertrain 30 as a whole.

The torque-modifier function 54 may determine the operating point (of motor 32) on the efficiency curve 70 corresponding to the torque request 46, and output a torque modifier 47 to increase motor efficiency. For instance, assume that the torque request 46 at a particular instant causes the operating point of motor 32 to be at the point marked A on the efficiency curve 70 of FIG. 4. At point A, the speed of the motor 32 is about 1800 RPM, its torque output $T_A$ is about 42 Nm, and its efficiency is about 77%. The torque-modifier function 54 will output a torque modifier 47 to nudge or move operating point A in the direction of increased motor efficiency. As seen from FIG. 4, moving the operating point A upwards (i.e., in the positive torque direction) increases the efficiency of the motor 32. Although moving operating point A as close to the 100% efficiency region (i.e. $\Delta T \rightarrow 100\%$) may be desirable from a motor efficiency point of view, a large movement of the operating point may produce a jerk and cause the bus to respond in an undesired manner. At operating point A (and any other operating point), there is an optimal amount of delta torque ($\Delta T$) that can be added to, or subtracted from, the torque $T_A$ without materially changing the response of the bus 10. That is, the change in torque output caused by adding/subtracting $\Delta T$ to the driver requested torque may not be perceived by the driver, or may not substantially change the response of the bus 10. A value of $\Delta T$ above or below this value may cause a noticeable and/or undesirable increase or decrease in acceleration (e.g., jerk, etc.) of the bus 10. In the exemplary case described above, the torque-modifier function 54 may output this value of $\Delta T$ as torque modifier 47. Adding or subtracting this value of torque from the torque request 46 will move the operating point of the motor 32 to a more efficient point without substantially changing the response of the bus 10.

The control unit 50 may then add the torque modifier 47 (output by the torque-modifier function 54) to the torque request 46 (output by the torque-request function 52) to determine the torque request signal 48. This torque request signal 48 may then be directed to the inverter 40. The inverter 40 may then control the motor 32 to produce the torque corresponding to the torque request signal 48. In the exemplary case described above, adding the torque modifier 47 (i.e., $\Delta T$) to the torque request 46 will change the operating point of motor 32 from point A to point B in efficiency curve 70 of FIG. 4. Moving the operating point from point A to point B increases the motor efficiency from 77% to about 87%. Moving the operating point from A to B will also increase the torque output of the motor 32 from $T_A$ (about 502 Nm) to about $T_B$ (about 100 Nm). However, prior experience may indicate that the 50 Nm ($T_B - T_A$) increase in torque output of the motor 32 (from what the driver actually requested) may not change the response of the bus 10 significantly and, in some cases, may not even be noticeable by the driver.

Values of delta torque ($\Delta T$) for different operating points may be obtained from maps (graphs, tables, charts, etc.) included in the torque-modifier function 54. For example, a map may list the acceptable values of $\Delta T$ for each operating condition (rotational speed and output torque combination) of the motor 32. And, based on the operating point that results from the torque request 46 at any time, the torque-modifier function 54 may output a value of $\Delta T$ as torque modifier 47 based on the map. In some embodiments, the map may provide the values of acceptable torque modifiers 47 (or $\Delta T$'s) for each operating condition, ambient environmental condition (temperature, precipitation, ice, etc.), bus condition (SOC, state of repair, etc.), and/or road condition (grade/slope of road, rough road, smooth road, etc.). In such embodiments, the torque-modifier function 54 may select a value of $\Delta T$ as torque modifier 47 based on the operating condition and some or all of the prevailing environmental, bus, and road conditions (e.g., SOC, inclination, weather conditions, etc.). Although the torque modifier 47 is described as being determined based on a map, it is also contemplated that in some embodiments, equations may be used to determine the value of torque modifier 47.

In some embodiments, delta torque ($\Delta T$) at different operating points of curve 70 may be experimentally determined and programmed in the torque-modifier function 54. In some embodiments, based on historical knowledge, $\Delta T$ may be selected as a predetermined percentage (e.g., 5%, 10%, etc.) of the torque at any operating point. This predetermined percentage may be a variable value dependent on the torque T at an operating point (e.g., $\Delta T$=about 20% of T). In some embodiments, $\Delta T$ may be a higher percentage of the torque T at low torque values and a lower percentage of the torque T at high torque values (e.g., $\Delta T$=about 80% T when $T \leq 100$ Nm and about 20% T when T>100 Nm). In some embodiments, $\Delta T$ may be selected as a first percentage (e.g., 100%) of the torque at torque values in a first range (e.g., 30-100 Nm), and a second percentage (e.g., 20%) of the torque at torque values in a second range (e.g., 100-300 Nm), etc. In some embodiments, the selected value of $\Delta T$ may be modified based on one or more of environmental conditions, bus conditions, and road conditions. For instance, during adverse weather conditions (e.g., when ice may be present on the road) or poor road conditions (rough road, etc.), the selected value of $\Delta T$ at an operating point may be decreased or de-rated. The possibility of ice on the road may be inferred based on sensor readings that indicate the ambient temperature and humidity/precipitation (i.e., ambient temp below a threshold value and humidity or precipitation above a threshold value). For example, suppose $\Delta T$ is selected as 40% T based on a map that lists $\Delta T$ at different operating points, the value of $\Delta T$ actually used as the torque modifier 47 may be de-rated (i.e., <40% T) when the weather conditions and/or road conditions are bad. It should be noted that although specific percentage values (e.g., 20%, 40%, 100%, etc.) are used in the description above, this is only for the sake of illustration. In general, $\Delta T$ at any operating point may be any percentage value of the torque (10%, 20%, 30%, 40%, 50%, 60%, 100%, 150%, etc.). It is also contemplated that, in some embodiments, the selected value of $\Delta T$ may depend on the motor speed at the operating point.

Figure 5:
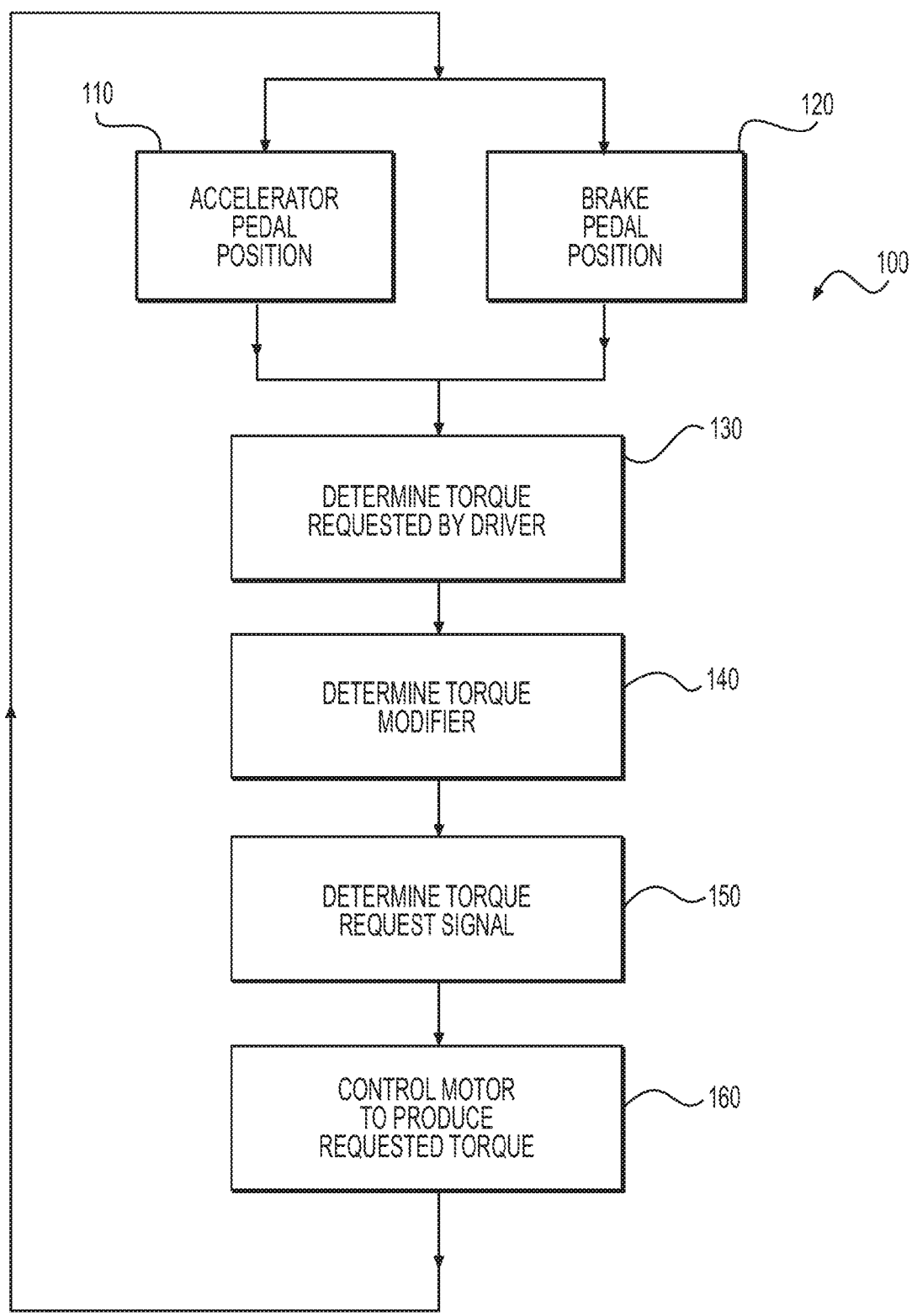
FIG. 5 is an illustration of an exemplary embodiment of the control method of the present disclosure.

FIG. 5 illustrates an exemplary method 100 of controlling the bus 10 using torque perturbation. Voltage signals corresponding to the accelerator pedal and brake pedal positions may be determined (steps 110 and 120) and directed to the control unit 50. The control unit 50 may then determine the torque requested by the driver from these inputs using maps, tables, etc. (step 130). The torque modifier corresponding to this determined torque may then be determined (step 140) based on the efficiency curve of the motor 32, environmental conditions, road conditions, bus conditions, and any limits on ΔT. The control unit 50 may then determine the torque request signal to be directed to the inverter as the algebraic sum of the driver's torque request and the torque modifier (which can be positive or negative) (step 150). The control system 50 and the inverter may then control the motor 32 to produce the requested torque (step 160).

Thus, to increase the efficiency of the motor 32, the control system 50 may modify the driver requested torque at every operating point in the efficiency curve 70 by adding or subtracting a value of torque that will not substantially change the operating characteristics of the bus. Modifying the operating point of the motor 32 in this manner may optimize the efficiency of the motor 32 and decrease its power consumption. Decreasing power consumption may result in increased operational efficiency of the bus 10.

While principles of the present disclosure are described herein with reference to an electric bus, it should be understood that the disclosure is not limited thereto. Rather, the systems and methods described herein may be employed to any electric or hybrid vehicle. Also, those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

I claim:

1. An electric vehicle, comprising:
    an electric motor configured to provide traction for the vehicle;
    a control unit configured to:
        receive a signal indicative of an operator desired torque and determine a torque modification factor at the desired torque from an efficiency map of the electric motor, the efficiency map indicating an efficiency of the electric motor as a function of output torque and rotational speed; and
        calculate a requested torque as the algebraic sum of the received desired torque and the determined torque modification factor; and
    an inverter operatively coupled to the control unit and the electric motor, the inverter being configured to receive a signal indicative of the calculated requested torque and control the electric motor to produce the requested torque.

2. The vehicle of claim 1, wherein the torque modification factor is an incremental value of torque that increases the efficiency of the electric motor without substantially changing a performance of the vehicle.

3. The vehicle of claim 1, wherein the efficiency map is programmed in the control unit.

4. The vehicle of claim 1, wherein the torque modification factor is a positive value of torque.

5. The vehicle of claim 1, wherein the torque modification factor is a negative value of torque.

6. The vehicle of claim 1, wherein the signal indicative of the operator desired torque is indicative of a position of at least one of an accelerator pedal or a brake pedal of the vehicle.

7. The vehicle of claim 6, wherein the signal indicative of the desired torque is further based on at least one of (i) a state of charge of a battery of the vehicle, (ii) inclination of the vehicle, and (iii) ambient weather conditions.

8. The vehicle of claim 1, wherein the vehicle is a bus.

9. A method of controlling an electric traction motor of an electric vehicle, comprising:
    receiving, at a control unit, a signal indicative of an operator desired torque;
    determining, using the control unit, a torque modification factor at the desired torque from an efficiency map of the electric motor, the efficiency map indicating an efficiency of the electric motor as a function of output torque and rotational speed;
    calculating, using the control unit, a requested torque as the algebraic sum of the received desired torque and the determined torque modification factor; and
    controlling the electric motor to produce the requested torque.

10. The method of claim 9, wherein determining the torque modification factor includes determining an incremental value of torque that increases the efficiency of the electric motor without substantially changing a performance of the vehicle.

11. The method of claim 10, wherein the torque modification factor is determined as a positive value of torque.

12. The method of claim 10, wherein the torque modification factor is determined as a negative value of torque.

13. The method of claim 9, wherein determining the torque modification factor includes determining the torque modification factor from the efficiency map programmed in the control unit.

14. The method of claim 9, wherein receiving the signal indicative of operator desired torque includes receiving a signal indicative of a position of at least one of an accelerator pedal or a brake pedal of the vehicle.

15. The method of claim 14, wherein receiving the signal indicative of operator desired torque further includes receiving a signal indicative of at least one of (i) a state of charge of a battery of the vehicle, (ii) inclination of the vehicle, and (iii) ambient weather conditions.

16. A method of controlling an electric traction motor of an electric vehicle, comprising:
    receiving a signal indicative of an operator desired torque;
    determining a torque modification factor at the operator desired torque from an efficiency map of the electric vehicle powertrain, the efficiency map indicating an efficiency of the powertrain as a function of at least output torque, rotational speed, and at least one ambient environmental condition or road condition;
    calculating a requested torque as the algebraic sum of the received operator desired torque and the determined torque modification factor; and
    controlling the electric motor to produce the requested torque.

17. The method of claim 16, wherein determining the torque modification factor includes determining an incremental value of torque that increases the efficiency of the powertrain without substantially changing a performance of the vehicle.

18. The method of claim 16, wherein the torque modification factor is determined as a positive value of torque.

19. The method of claim 16, wherein the torque modification factor is determined as a negative value of torque.

20. The method of claim 16, wherein receiving the signal indicative of operator desired torque includes receiving a signal indicative of a position of at least one of an accelerator pedal or a brake pedal of the vehicle.

\* \* \* \* \*